United States Patent [19]

Dogliotti et al.

[11] 4,076,956

[45] Feb. 28, 1978

[54] DECISION NETWORK FOR RECEIVER OF PSK DIGITAL SIGNALS

[75] Inventors: Renato Dogliotti; Umberto Mazzei, both of Turin, Italy

[73] Assignee: CSELT - Centro Studi e Laboratori Telecomunicazioni, Torino, Italy

[21] Appl. No.: 670,534

[22] Filed: Mar. 25, 1976

[30] Foreign Application Priority Data

Mar. 27, 1975 Italy .................................. 67780/75

[51] Int. Cl.² ............................................ H04L 15/24
[52] U.S. Cl. ...................................... 178/88; 325/320; 178/67
[58] Field of Search ..................... 178/88, 67; 325/30, 325/320

[56] References Cited

U.S. PATENT DOCUMENTS

| 3,706,945 | 12/1972 | Yanagidaira | 178/67 |
| 3,805,191 | 4/1974 | Kawai | 325/320 |
| 3,818,346 | 6/1974 | Fletcher | 178/88 |
| 3,845,412 | 10/1974 | Rearwin | 178/67 |

Primary Examiner—Robert L. Griffin
Assistant Examiner—Michael A. Masinick
Attorney, Agent, or Firm—Karl F. Ross

[57] ABSTRACT

In a phase-shift-keying (PSK) signaling system with or without amplitude modulation, using two channel carriers of like frequency in relative phase quadrature to identify one of eight signal levels, each signal level is associated with one of eight equispaced radii emanating from the center of an orthogonal matrix or coordinate system. That matrix is divided by its coordinate axes into four quadrants each encompassing three zones of potential signal deviation, i.e. a middle zone centered on the bisector of the quadrant and two lateral zones whose outer boundaries coincide with those of the quadrant. The signals incoming at a receiver input over the two channels are coherently detected and filtered to supply a pair of coordinates defining a point on the matrix generally falling into one of the three zones of a quadrant; upon conversion into digital form, with six modular bits and one sign bit each, these signals by their modular bits address one of 4,096 cells of a first read-only memory to call forth one of three two-bit combinations stored in these cells. The bit combination so read out identifies the zone — irrespective of quadrant — defined by the detected coordinates; these bits, together with the sign bits derived from the incoming signals, address one of 12 cells in a second read-only memory which thereupon delivers a three-bit word indicating the corresponding signal level and, if desired, two collateral multibit words fed back to the receiver input for correcting distortions of the next-following signals.

10 Claims, 6 Drawing Figures

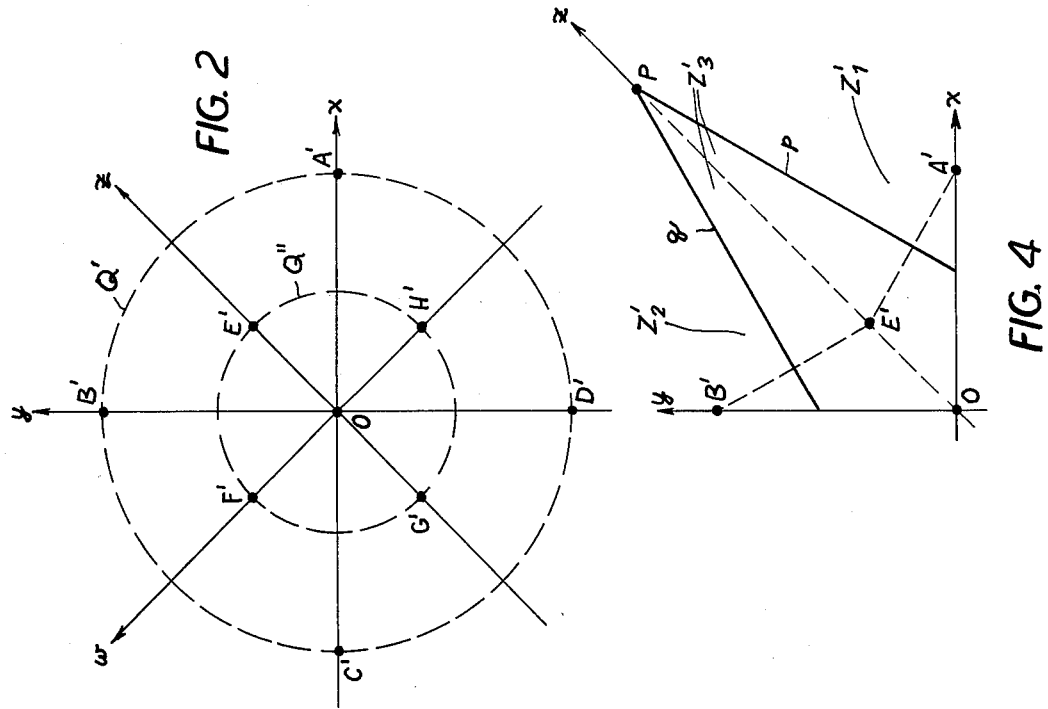
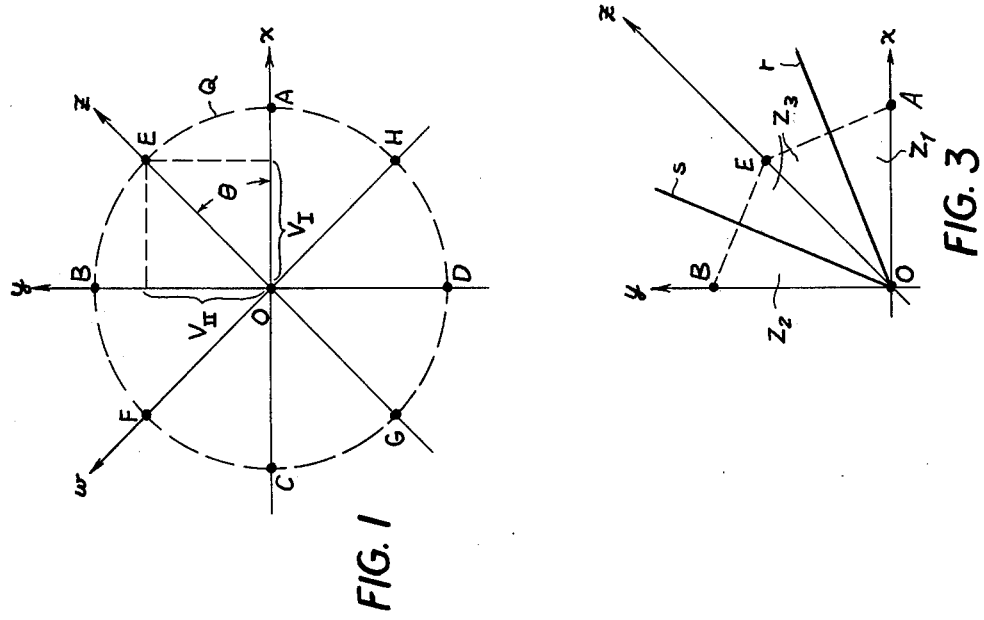

DECISION NETWORK FOR RECEIVER OF PSK DIGITAL SIGNALS

FIELD OF THE INVENTION

Our present invention relates to a digital signaling system of the phase-shift-keying (PSK) type and more particularly to a receiver for multilevel signals transmitted in such a system via two conjugate channel carriers modulated in a correlated manner. Such a system may operate with straight angle modulation or with mixed angle and amplitude modulation.

BACKGROUND OF THE INVENTION

In order to recover the transmitted digital signals from such conjugate carrier waves of like frequency identifying $n$ different signal levels by the ratio of their peak amplitudes, it is known to demodulate these carriers with the aid of coherent detectors having control inputs connected to sources of two oscillations of carrier frequency in relative phase quadrature, these oscillations thus being of the form $K\cos\omega_c t$ and $K\sin\omega_c t$ where K is a constant and $\omega_c$ is the pulsatance of the carrier waves. With, say, oscillation $K\sin\omega_c t$ suitably synchronized with a carrier oscillator at the transmitting end to define a reference axis, the coherently demodulated carriers give rise to two input voltages defining respective coordinates of an imaginary coordinate system, referred to hereinafter as an orthogonal matrix locating a point on that matrix, which lies on a radius including with the reference axis a certain angle $\theta$ adapted to assume — ideally — any of $n$ different values. In practice, this angle will vary on reception within certain tolerance limits about the $n$ nominal values of $\theta$.

These variations are due, at least in part, to two kinds of distortions occurring in such two-channel systems, namely an intrachannel distortion between signals transmitted in successive cycles and an interchannel distortion resulting from the interaction of substantially concurrently transmitted signals on the two channels. For a discussion of this general problem, in a somewhat different system using quadrature amplitude modulation (QAM) without mutual correlation, reference may be made to an article by D. D. Falconer and G. J. Foschini entitled "Theory of Minimum Means-Space-Error QAM Systems Employing Decision Feedback Equalization", Bell System Technical Journal, December, 1973, page 1821.

In commonly owned U.S. application Ser. No. 620,140, filed 6 Oct. 1975 by Giovanni Tamburelli, now U.S. Pat. No. 4,029,903, there has been disclosed a receiver for PSK digital signals with or without amplitude modulation wherein the aforementioned distortions are compensated by a feedback circuit which modifies the two input voltages delivered by the coherent channel detectors to a decision unit. That unit comprises an orthogonal matrix with two intersecting arrays of leads selectively energizable under the control of these two input voltages, the simultaneous energization of one lead from each array identifying one of $n$ stages of a read-only memory as determined by the location of the point of intersection of the two leads in one of $n$ sectors of the matrix. The data read out from any memory stage so addressed include an angle signal $S_\theta$, representing the signal level defined by the incoming carriers, as well as two collateral feedback signals $V\sin\theta$ and $V\cos\theta$ which are to be superimposed upon the input voltages detected during the next cycle.

The sectors of the matrix represent zones of optimal reception or of possible signal deviation within which a signal subject to normal distortions (due to thermal noise with Gaussian distribution) may stray upon reception. With simple angle modulation (i.e. in the absence of supplemental amplitude modulation) and with $n = 8$ according to the particular case described in U.S. Pat. No. 4,029,903, the sectors may be considered identical with a vertex angle of $\pi/4$, each sector being bisected by a radius including a respective angle $\theta$ with a reference line such as the abscissa axis of a system of cartesian coordinates. The geometries of the optimal zones, however, are more complex in systems with mixed angle and amplitude modulation. In the latter type of systems, moreover, the position of the zonal boundaries depends also on the coefficient of amplitude modulation; thus, a switchover from straight angle modulation to mixed modulation may produce different zone configurations, depending on whether the two systems are to operate with, say, equal peak power or equal average power.

OBJECTS OF THE INVENTION

The general object of our present invention, therefore, is to provide an improved decision network for a receiver of the aforedescribed type which can be more conveniently adapted to differernt zonal boundaries, e.g. upon switchover from straight angle modulation to mixed modulation or vice versa.

Another object is to enable the use of simplified read-only memories in such a decision network, realizable as integrated components and enabling the use of elevated transmission speeds beyond those on the order of Mbaud/sec available by conventional means.

SUMMARY OF THE INVENTION

In conformity with our present invention, a decision network designed to identify one of $4b$ different signal levels ($b$ being an integer preferably greater than 1) includes a first stage for converting the relationship of the absolute magnitudes of the two bipolar input voltages, obtained from respective demodulators, into a zone-identifying code and a second stage in cascade with the first stage for deriving an angle code from the zone-identifying code and from the polarities of the two input voltages. These polarities identify any one of four quadrants of an imaginary orthogonal matrix or coordinate system on which the several signal levels are represented by predetermined locations on respective radii including different angles $\theta$ with a fixed reference direction such as one of the coordinate axes, e.g. the abscissa axis. Each of the quadrants defined by the two coordinate axes is divided into $b+1$ zones of possible signal deviation as discussed above, each zone being proximal to one of the aforementioned locations. With $b=2$ and $\theta=0$, $\pi/4$, $\pi/2$, $3\pi/4$, etc., the zones of each quadrant include a a middle zone flanked by two lateral zones, the latter being bounded by the coordinate axes.

According to a more specific feature of our invention, the two cascaded stages of the decision network comprise a first and a second read-only memory, respectively, the cells of the first memory being jointly addressable by modular bits derived from the two input voltages by a pair of analog/digital converters which quantize the voltages produced by the coherent detectors serving as demodulators. Each of the cells of this first memory stores one of $b+1$ binary zone-identifying codes which, together with two sign bits derived from the input voltages of the analog/digital converters, address the cells of the second memory each storing one of $2^{b+1}$ angle codes. In the 8-level system here particularly contemplated, with $b=2$, the second memory thus may have $2^3=8$ principal output leads selectively energizable to indicate one of these 8 signal levels; with feedback circuitry of the type described in the above-identified Tamburelli patent, this second memory also has two ancillary output multiples carrying the multibit collateral signals.

Since the cells of the first-stage memory need not store these multibit codes, that memory can be laid out with a large number of cells for very exactly pinpointing the location of each incoming signal on the imaginary matrix divided into the aforementioned zones of possible signal deviation. With identical zone distributions in all the quadrants, the modular bits delivered to the first memory without the accompanying sign bits identify the correct zone regardless of quadrant. The missing quadrant identification is supplied by the second memory in response to the sign bits.

BRIEF DESCRIPTION OF THE DRAWING

The above and other features of our invention will now be described in detail with reference to the accompanying drawing in which:

FIG. 1 is a phase diagram for an 8-level PSK system with straight angle modulation;

FIG. 2 is a similar phase diagram with mixed angle and amplitude modulation;

FIG. 3 is a diagram showing one of the quadrants of FIG. 1 divided into several optimal zones;

FIG. 4 is a diagram similar to FIG. 3, showing one of the quadrants of FIG. 2 with its optimal zones;

SPECIFIC DESCRIPTION

Figure 5:
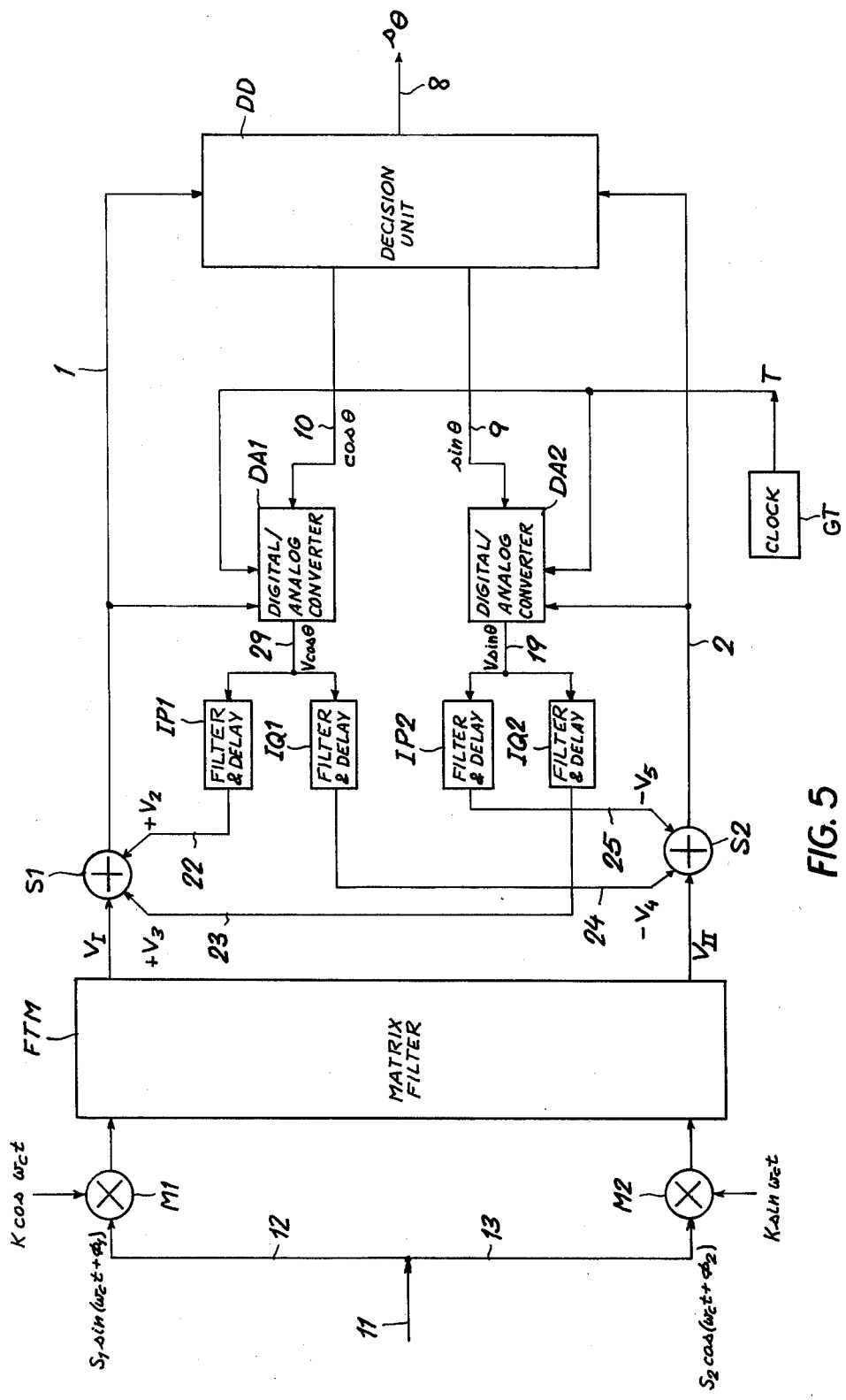
FIG. 5 is an overall block diagram of a PSK receiver with feedback according to the disclosure of U.S. Pat. No. 4,029,903.

In FIG. 1 we have shown an imaginary matrix centered on the origin O of a system of cartesian coordinates with axes $x$ and $y$. The two coordinate axes define four quadrants into which the matrix is divided, these quadrants being in turn bisected by two inclined axes $z$ and $w$ including 45° angles therewith. The axes $x$, $y$, $z$ and $w$ intersect a circle Q, centered on origin O, at points A and C, B and D, E and G, F and H, respectively. These points represent the ideal locations of a signal defined by two input voltages $V_I$ and $V_{II}$ (as particularly indicated for point E) derived by demodulation, as more fully described hereinafter, from two conjugate high-frequency carriers concurrently arriving over a transmission path. Thus, points A-H lie on respective radii including with abscissa $x$ an angle $\theta$ which ranges from 0 (for point A) to $7\pi/4$ (for point H).

FIG. 2 shows a generally similar matrix wherein, however, points A', B', C' and D' lie on a larger circle Q' whereas points E', F', G', H' lie on a smaller circle Q" concentric therewith. The angle modulation is the same as in the preceding case, with $\theta$ ranging from 0 through $7\pi/4$, yet there is also an amplitude modulation represented by the different radii of circles Q' and Q". Thanks to this mixed modulation, adjacent points such as A' and E' are more widely separated than corresponding points such as A and E in FIG. 1 even though the average transmitted power is about the same in both instances.

FIG. 3 shows one of the four quadrants of the imaginary matrix of FIG. 1, i.e. the quadrant bounded by the positive branches of axes $x$ and $y$. This quadrant is subdivided by two further lines $r$ and $s$, emanating from origin O and bisecting the distances A-E and E-B, into three contiguous zones of possible signal deviation, i.e. a first lateral zone $Z_1$ associated with point A, a second lateral zone $Z_2$ associated with point B, and a middle zone $Z_3$ associated with point E. Lateral zones $Z_1$ and $Z_2$ have symmetrical duplicates in adjoining quadrants, also associated with points A and B, respectively. Thus, any signal appearing in zone $Z_1$ (or in its duplicate) will be assumed to represent the level $\theta=0$ of point A; similarly, any signal appearing in zone $Z_2$ (or its duplicate) will be allocated to level $\theta=\pi/2$ of point B. By the same token, signals falling into zone $Z_3$ are assigned to level $\theta=\pi/4$ of point E.

The three other quadrants, not shown in FIG. 3, are analogously subdivided into identically distributed middle and lateral zones.

FIG. 4 shows the corresponding quadrant of FIG. 2 with its points A', B' and E'. Distance A'-E' is bisected by a line $p$ which, like a similar line $q$ bisecting the distance E'-B', intersects the axis $z$ at a point P. By these bisectors $p$ and $q$ the quadrant is again subdivided into three contiguous zones of possible signal deviation, i.e. two lateral zones $Z'_1$, $Z'_2$ and a middle zone $Z'_3$ respectively associated with points A', B' and E'. In this instance the boundaries $p$ and $q$ between the zones of the quadrant no longer emanate from origin O. The lateral zones $Z'_1$ and $Z'_2$ are again duplicated in adjoining quadrants, with the zone distribution identical for all the quadrants.

FIG. 5 shows an incoming communication link 11 on which two relatively phase-shifted carriers $S_1\sin(\omega_c t + \phi_1)$ and $S_2\cos(\omega_c t - \phi_2)$ are received, these carriers being channeled via respective lines 12 and 13 to a pair of coherent detectors M1 and M2 whose control inputs receive reference oscillations $K\cos\omega_c t$ and $K\sin\omega_c t$ from conjugate sources, K being a constant. The carrier amplitude $S_1$, $S_2$ may undergo distortions in transit, even as the phase may be distorted by shift angles $\phi_1$, $\phi_2$ so that the arriving carriers are no longer strictly in quadrature with each other. These detectors, whose mode of operation is well known per se, produce a pair of pulse trains which are integrated in a low-pass filter stage FTM, e.g. a conventional filter matrix also acting as a pulse shaper. In connection with the design of such filters, reference may be made to the aforementioned article by Falconer and Foschini as well as to an article by A. C. Salazar entitled "Design of Transmitter and Receiver Filters for Decision Feedback Equalization", Bell System Technical Journal, March, 1974, page 503. The input voltages thus demodulated, designated $V_I$ and $V_{II}$, are fed to a pair of summing circuits S1, S2 where they are combined with corrective voltages $+V_2$, $+V_3$ and $-V_4$, $-V_5$ pursuant to the disclosure of the commonly owned Tamburelli patent referred to above. The resulting voltages pass via lines 1 and 2 to a decision unit DD emitting an output signal $S_\theta$, delivered over a multiple 8 to a nonillustrated processor, and two collateral signals $\cos\theta$ and $\sin\theta$ delivered via respective multiples 10 and 9 to a pair of digital/analog converters DA1, DA2 which are controlled by a timing signal T from a clock circuit GT. Converter DA1, also receiving the voltage $V_I$ from circuit S1 to synthesize a feedback voltage $V\cos\theta$, works via a conductor 29 into a pair of filtering and delay circuits IP1, IQ1 whose output leads 22 and 24 carry the corrective voltages $V_2$ and $V_4$ to summing circuits S1 and S2 for additive and subtractive superposition, respectively, upon input voltages $V_I$ and $V_{II}$. Similarly, converter DA2 receives the voltage $V_{II}$ from circuit S2 to synthesize a feedback voltage $V\sin\theta$ and works via a conductor 19 into a pair of filtering and delay circuits IP2, IQ2 whose output leads 25 and 23 carry the corrective voltages $V_5$ and $V_3$ to circuits S2 and S1 for subtractive and additive superposition, respectively, upon input voltages $V_{II}$ and $V_I$. Voltages $V_2$ and $V_5$ serve to compensate in-phase or intrachannel distortions whereas voltages $V_3$ and $V_4$ are designed to cancel quadrature or interchannel distortions. Since these two types of distortion arise at different instants in a signaling cycle, the delay of filtering units IP1 and IP2 differs from that of filtering units IQ1 and IQ2. With single-sideband transmission the quadrature filters IQ1 and IQ2 may be Hilbert transformers.

Figure 6:
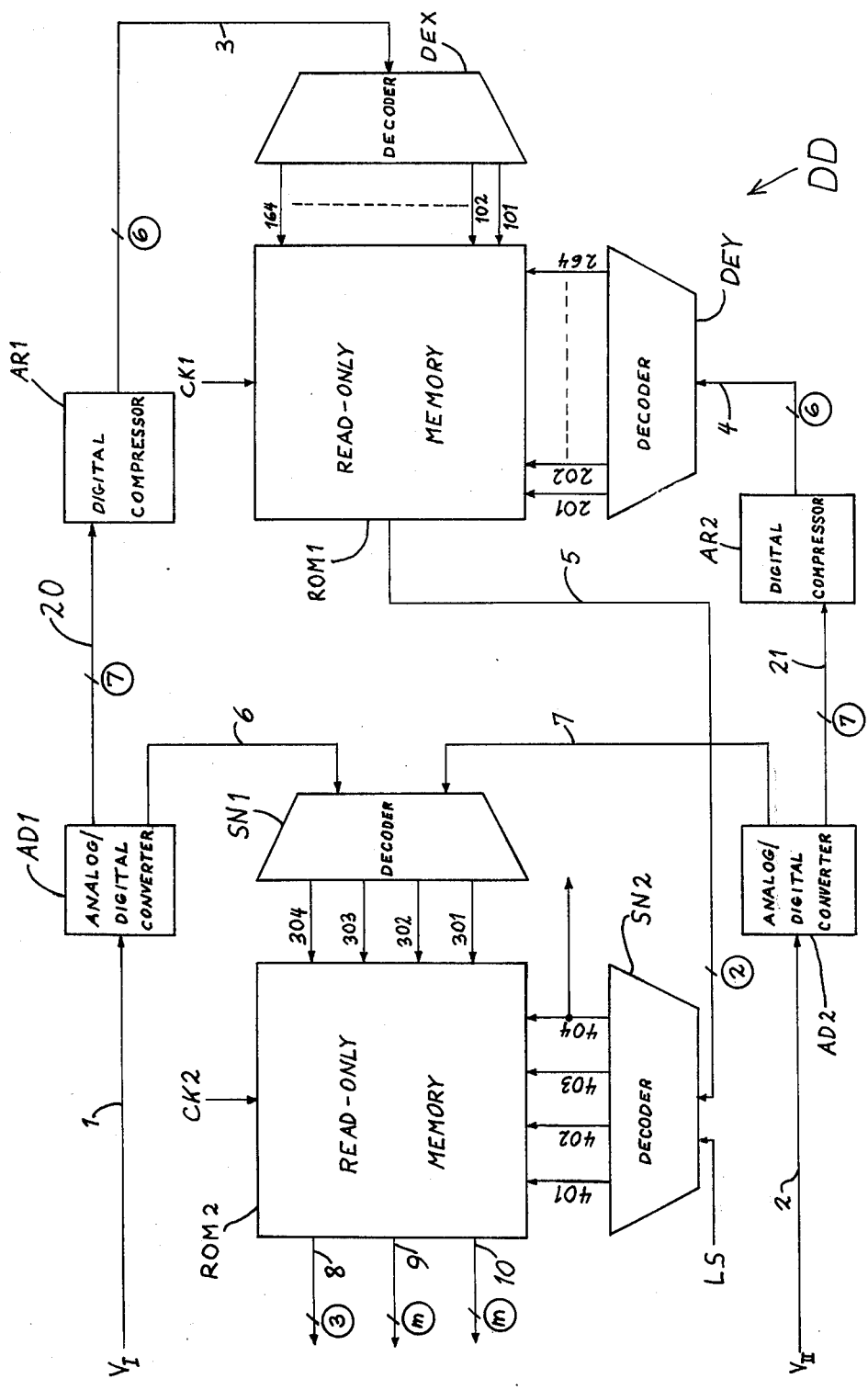
FIG. 6 is a more detailed diagram of a decision unit included in the receiver of FIG. 5.

Reference will now be made to FIG. 6 for a detailed illustration of the decision unit or network DD of FIG. 5. In accordance with our present invention, this network comprises two read-only memories ROM1 and ROM2 controlled by relatively staggered timing pulses CK1 and CK2 from clock circuit GT (FIG. 5). The input voltages $V_I$ and $V_{II}$ of leads 1 and 2, modified by superimposed feedback voltages as described above, are fed within unit DD to a pair of analog/digital converters AD1 and AD2 in which these bipolar voltages are quantized to yield two binary words of 8 bits each, i.e. a polarity-indicating sign bit and seven magnitude-indicating modular bits. These modular bits are transmitted by way of respective multiples 20 and 21, of seven leads each as diagrammatically indicated by a circled numeral "7", to a pair of digital compressors AR1 and AR2 suppressing the least-significant (seventh) bit; naturally, these compressors can be omitted if converters AD1 and AD2 have only six modular output leads instead of the seven referred to. The truncated 6-bit words from compressors AR1 and AR2 are delivered via respective 6-lead multiples 3 and 4 to a pair of decoders DEX and DEY with $2^6=64$ output leads each. Output leads 101–164 of decoder DEX are selectively energizable, under the control of the incoming word, to address one of 64 rows of an array of $64\times 64=4096$ cells of memory ROM1. In an analogous way, the output leads 201–264 of decoder DEY are selectively energizable to address one of 64 columns in the array of cells of that memory. The cell lying at the intersection of the addressed column and row emits, on a 2-lead output multiple 5, a 2-bit binary code identifying one of the zones $Z_1$, $Z_2$, $Z_3$ (or $Z'_1$, $Z'_2$, $Z'_3$) of any quadrant. Thus, the storage capacity of each cell of memory ROM1 is limited to two bits. Naturally, the number $h$ of utilized modular bits may be different from six.

The sign bits produced by converters AD1 and AD2 are fed via single leads 6 and 7 to a third decoder SN1 with four output leads 301–304 serving to address respective rows of a 16-cell array of memory ROM2. Three of the four columns of that array are addressable by the zone-identifying code on output multiple 5 via a fourth decoder SN2 with output leads 401–403. A fourth output lead 404 of decoder SN2, working into the fourth column of the array of memory ROM2, is energizable by a locally generated supervisory signal LS and may be used for testing the operation of the circuit shown in FIG. 5.

Output multiple 8, carrying the signal $S_\theta$ referred to in conjunction with FIG. 5, emanates from memory ROM2 and has three leads to carry any one of eight possible 3-bit combinations to the associated processor. In a system without feedback, lacking the ancillary multiples 9 and 10 of FIG. 5, such a 3-bit code is all that needs to be stored in any of the cells of memory ROM2. In a feedback-type system, on the other hand, each cell of this memory has a storage capacity of $2m+3$ bits in order to be able to read out two ancillary codes for the trigonometric functions $\sin\theta$ and $\cos\theta$ $m$-lead multiples 9 and 10, $m$ being a number large enough to define these functions with the desired degree of accuracy.

Thus, the second-stage memory ROM2 of a decision network according to our invention has only 12 cells (aside from those used for supervisory purposes) of large storage capacity in a feedback-type PSK system. It will also be apparent that any modification of the geometry of the zones shown in FIGS. 3 and 4, e.g. to change the radii of circles Q' and Q'' in FIG. 2 or to switch between the two modulation systems of FIGS. 1 and 2, can be easily carried out by merely altering the contents of the cells of memory ROM1 to take the new zonal boundaries into account; this applies also to changes necessitated by variations in the distortion-causing parameters of the system. Any relocation of reference axis $x$, affecting the position of the quadrants, can be similarly accommodated by changing the contents of the cells of memory ROM2.

The need for 12 memory cells storing eight different signal levels arises from the fact that, as described above with reference to FIGS. 3 and 4, certain of these levels ($\theta=0$, $\pi/2$, $\pi$ and $3\pi/2$) are associated with two optimal zones each in a pair of adjoining quadrants.

We claim:

1. In a receiver for digital message signals transmitted via two conjugate carrier waves of like frequency identifying $4b$ different signal levels, $b$ being an integer, in combination:

first and second demodulating means for deriving from said carrier waves a first and a second bipolar input voltage defining respective coordinates of an imaginary coordinate system divided by its coordinate axes into four quadrants, the input voltages concurrently derived by said first and second demodulating means defining a point on one of said quadrants in the vicinity of one of $4b$ predetermined locations on respective radii emanating from the origin of said coordinate system, each of said radii including with a fixed reference direction an angle representing one of said signal levels, each quadrant being divided into $b+1$ zones of possible signal deviation, each of said zones encompassing one of said predetermined locations, said zones being identically distributed in all quadrants, said first and second demodulating means comprising a pair of coherent detectors followed by a pair of analog-digital converters for quantizing said input voltages, thereby forming binary words each including a sign bit and a multiplicity of modular bits; and decision means connected to said first and second demodulating means for identifying the corresponding signal level in response to said input voltages, said decision means including a first stage for converting the relationship of the absolute magnitudes of said input voltages into a zone-identifying code and a second stage in cascade with said first stage for deriving an angle code from said zone-identifying code and from the polarities of said input voltages;

said first stage comprising a first read-only memory with first cells jointly addressable by the modular bits of said first and second input voltages, each of said first cells storing one of $b+1$ binary-zone-identifying codes, said second stage comprising a second read-only memory with second cells jointly addressable by said zone-identifying codes and by the sign bits of said first and second input voltages, each of said second cells storing one of $2b+1$ angle codes.

2. The combination defined in claim 1 wherein each of said second cells further stores a pair of corrective binary words trigonometrically related to the corresponding angle code, said second memory being provided with a main output carrying said angle code and with two collateral outputs carrying said corrective words, said first and second demodulating means being provided with feedback circuitry connected to said collateral outputs for superimposing said corrective words upon succeeding first and second input voltages.

3. The combination defined in claim 1 wherein $b=2$, said quadrants being bounded by four of said radii and bisected by the four remaining radii, adjacent zones within a quadrant being separated by lines substantially bisecting the distances between said predetermined locations on adjoining radii.

4. The combination defined in claim 1 wherein $b=2$, each of said zone-identifying codes being a bit pair, said first cells being disposed in said first memory in an array of $2^h$ rows and $2^h$ columns where $h$ is the number of modular bits utilized from each of said input voltages, said first memory being provided with $2^h$ row inputs and with $2^h$ column inputs for addressing said first cells and with a pair of readout leads for the bit pair of an addressed first cell, said second cells being disposed in said second memory in an array of three columns and four rows, said second memory being provided with three column inputs and with four row inputs for addressing said second cells, each of said analog/digital converters being provided with an $h$-lead output multiple for the utilized modular bits thereof and with a single output lead for the corresponding sign bit; further comprising a first decoder connected between the output multiple of one of said converters and said $2^h$ row inputs, a second decoder connected between the output multiple of the other of said converters and said $2^h$ column inputs, a third decoder connected between the single output leads of said converters and said four row inputs, and a fourth decoder connected between said pairs of readout leads and said three column inputs.

5. The combination defined in claim 4 wherein $h=6$.

6. The combination defined in claim 4 wherein said second memory is provided with a fourth column input connected to said fourth decoder for receiving a locally generated test signal therefrom.

7. In a receiver for digital message signals transmitted via two conjugate carrier waves of like frequency identifying eight different signal levels, in combination:

first and second demodulating means for deriving from said carrier waves a first and second bipolar input voltage defining respective coordinates of an imaginary coordinate system divided by its coordinate axes into four quardants, the input voltages concurrently derived by said first and second demodulating means defining a point on one of said quadrants in the vicinity of one of eight predetermined locations on four radii in line with said coordinate axes and on four radii bisecting said quadrants, each of said radii including an angle representative of one of said signal levels with a fixed reference direction coinciding with one of said radii, each quadrant being divided into three zones of possible signal deviation, adjacent zones within each quadrant being separated by lines substantially bisecting the distances between said predetermined locations on adjoining radii; and decision means connected to said first and second demodulating means for identifying the corresponding signal level in response to said input voltages, said decision means including a first stage for converting the relationship of the absolute magnitudes of said input voltages into a zone-identifying code and a second stage in cascade with said first stage for deriving an angle code from the zone-identifying code and from the polarities of said input voltages.

8. The combination defined in claim 7 wherein said first and second demodulating means comprise a pair of coherent detectors followed by a pair of analog-digital converters for quantizing said input voltages.

9. The combination defined in claim 7 wherein said predetermined locations lie on a common circle centered on the intersection of said coordinate axes, the lines separating the zones of a quadrant originating at said intersection and diverging at angles of substantially $\pi/8$ from said coordinate axes.

10. The combination defined in claim 7 wherein said predetermined locations lie on a larger circle at the boundaries of said quadrants and on a smaller circle midway of said quadrants, the lines separating the zones of a quadrant converging on the bisector of the quadrant.

* * * * *